(12) United States Patent
Lee et al.

(10) Patent No.: US 11,358,121 B2
(45) Date of Patent: Jun. 14, 2022

(54) SUPER ABSORBENT POLYMER AND METHOD FOR PRODUCING SAME

(71) Applicant: LG Chem, Ltd., Seoul (KR)

(72) Inventors: Yong Hun Lee, Daejeon (KR); Jung Min Sohn, Daejeon (KR); Hyemin Lee, Daejeon (KR); Chang Sun Han, Daejeon (KR)

(73) Assignee: LG Chem, Ltd.

( * ) Notice: Subject to any disclaimer, the term of this patent is extended or adjusted under 35 U.S.C. 154(b) by 199 days.

(21) Appl. No.: 16/094,563

(22) PCT Filed: Oct. 25, 2017

(86) PCT No.: PCT/KR2017/011853
§ 371 (c)(1),
(2) Date: Oct. 18, 2018

(87) PCT Pub. No.: WO2018/117390
PCT Pub. Date: Jun. 28, 2018

(65) Prior Publication Data
US 2019/0099739 A1    Apr. 4, 2019

(30) Foreign Application Priority Data

Dec. 23, 2016  (KR) .................. 10-2016-0178406

(51) Int. Cl.
| | |
|---|---|
| *B01J 20/26* | (2006.01) |
| *B01J 20/28* | (2006.01) |
| *B01J 20/30* | (2006.01) |
| *B01J 20/32* | (2006.01) |
| *C08F 20/06* | (2006.01) |
| *C08J 3/24* | (2006.01) |
| *C08K 5/101* | (2006.01) |
| *C08L 33/06* | (2006.01) |
| *C08F 2/44* | (2006.01) |
| *C08J 3/075* | (2006.01) |
| *C08J 3/12* | (2006.01) |
| *C08K 5/11* | (2006.01) |

(52) U.S. Cl.
CPC ....... *B01J 20/267* (2013.01); *B01J 20/28016* (2013.01); *B01J 20/3021* (2013.01); *B01J 20/3085* (2013.01); *B01J 20/321* (2013.01); *B01J 20/3219* (2013.01); *B01J 20/3282* (2013.01); *B01J 20/3293* (2013.01); *C08F 2/44* (2013.01); *C08F 20/06* (2013.01); *C08J 3/075* (2013.01); *C08J 3/12* (2013.01); *C08J 3/24* (2013.01); *C08J 3/245* (2013.01); *C08K 5/101* (2013.01); *C08K 5/11* (2013.01); *C08L 33/06* (2013.01); *C08F 2810/20* (2013.01); *C08J 2333/08* (2013.01)

(58) Field of Classification Search
None
See application file for complete search history.

(56) References Cited

U.S. PATENT DOCUMENTS

| | | | |
|---|---|---|---|
| 5,422,405 A | 6/1995 | Dairoku et al. | |
| 5,562,646 A | 10/1996 | Goldman et al. | |
| 5,563,218 A | 10/1996 | Rebre et al. | |
| 6,514,615 B1 | 2/2003 | Sun et al. | |
| 9,751,995 B2* | 9/2017 | Joo | B01J 20/28004 |
| 9,976,003 B2* | 5/2018 | Lee | C08F 265/04 |
| 10,023,703 B2* | 7/2018 | Lee | C08J 3/24 |
| 10,285,866 B2* | 5/2019 | Ryu | C08F 220/06 |
| 2008/0075937 A1 | 3/2008 | Wada et al. | |
| 2014/0031473 A1 | 1/2014 | Nogi et al. | |
| 2015/0093575 A1 | 4/2015 | Naumann et al. | |
| 2015/0225514 A1 | 8/2015 | Kimura et al. | |

(Continued)

FOREIGN PATENT DOCUMENTS

| | | |
|---|---|---|
| CN | 104039847 A | 9/2014 |
| CN | 105392805 A | 3/2016 |

(Continued)

OTHER PUBLICATIONS

Extended European Search Report including Written Opinion for Application No. EP17883766.2 dated Feb. 28, 2019.
Third Party Observation dated Apr. 19, 2019 in corresponding application PCT/KR2017/011853, pp. 1-15.
Chinese Search Report for Application No. 201780026460.3 dated Sep. 3, 2020, 2 pages.
Buchholz, F.L. and Graham, A.T., "Modern Superabsorbent Polymer Technology," John Wiley & Sons(1998), p. 161.
Odian, George, Principles of Polymerization, 2nd Edition, John Wiley & Sons, 1981, p. 203.

(Continued)

*Primary Examiner* — Joseph D Anthony
(74) *Attorney, Agent, or Firm* — Lerner, David, Littenberg, Krumholz & Mentlik, LLP

(57) ABSTRACT

The present invention relates to a super absorbent polymer exhibiting more improved absorption under pressure and liquid permeability, even while basically maintaining excellent centrifuge retention capacity and absorption rate, and a method for producing the same. The super absorbent polymer comprises: a base polymer powder including a first crosslinked polymer of a water-soluble ethylenically unsaturated monomer having at least partially neutralized acidic groups; and a surface crosslinked layer formed on the base polymer powder and including a second crosslinked polymer in which the first crosslinked polymer is further crosslinked via a surface crosslinking agent, wherein the surface crosslinking agent includes at least two compounds having a solubility parameter value ($\sigma$) of 12.5 $(cal/cm^3)^{1/2}$ or more, and wherein at least one of the surface crosslinking agents is an alkylene carbonate-based compound, and the remainder is selected from the group consisting of an alkylene carbonate-based compound and a polyhydric alcohol-based compound.

7 Claims, No Drawings

(56) References Cited

U.S. PATENT DOCUMENTS

| | | | |
|---|---|---|---|
| 2015/0283284 A1* | 10/2015 | Azad | C08J 9/36 604/368 |
| 2015/0315321 A1 | 11/2015 | Won et al. | |
| 2016/0030921 A1 | 2/2016 | Ryu et al. | |
| 2016/0060418 A1* | 3/2016 | Tian | C08J 3/12 521/114 |
| 2016/0151531 A1 | 6/2016 | Lee et al. | |
| 2016/0208035 A1* | 7/2016 | Ryu | C08F 220/06 |
| 2016/0271584 A1 | 9/2016 | Lee et al. | |
| 2017/0015798 A1* | 1/2017 | Lee | C08F 2/10 |
| 2017/0021334 A1 | 1/2017 | Ryu et al. | |
| 2017/0029576 A1* | 2/2017 | Lee | C08F 265/02 |
| 2017/0073478 A1* | 3/2017 | Joo | C08K 3/00 |
| 2017/0114192 A1 | 4/2017 | Kim et al. | |
| 2018/0079847 A1* | 3/2018 | Lee | C08F 220/06 |
| 2018/0185820 A1 | 7/2018 | Tada et al. | |
| 2018/0237593 A1 | 8/2018 | Nam et al. | |
| 2018/0243464 A1 | 8/2018 | Hwang et al. | |
| 2018/0265653 A1 | 9/2018 | Lee et al. | |
| 2019/0077924 A1* | 3/2019 | Lee | B01J 20/28016 |
| 2020/0009529 A1* | 1/2020 | Nam | C08K 5/053 |

FOREIGN PATENT DOCUMENTS

| | | |
|---|---|---|
| CN | 105722863 A | 6/2016 |
| EP | 0605150 A1 | 7/1994 |
| EP | 0615736 A1 | 9/1994 |
| EP | 0532002 B1 | 5/1997 |
| EP | 1637105 A1 | 3/2006 |
| EP | 2669318 A1 | 12/2013 |
| EP | 2881419 A1 | 6/2015 |
| EP | 2952537 A1 | 12/2015 |
| EP | 3018149 A1 | 5/2016 |
| EP | 3101038 A1 | 12/2016 |
| EP | 3235856 A1 | 10/2017 |
| EP | 3279238 A1 | 2/2018 |
| EP | 3342800 A1 | 7/2018 |
| EP | 3375810 A1 | 9/2018 |
| EP | 3424988 A1 | 1/2019 |
| JP | 2015120933 A | 7/2015 |
| JP | 5914677 B2 | 5/2016 |
| KR | 100876827 B1 | 1/2009 |
| KR | 101471982 B1 | 12/2014 |
| KR | 101495845 B1 | 2/2015 |
| KR | 20150143167 A | 12/2015 |
| KR | 20160016714 A | 2/2016 |
| KR | 20170043838 A | 4/2017 |
| KR | 20170111295 A | 10/2017 |
| WO | 2005092956 A1 | 10/2005 |
| WO | 2006033477 A1 | 3/2006 |
| WO | 2009110645 A1 | 9/2009 |
| WO | 2012070845 A2 | 5/2012 |
| WO | 2012102407 A1 | 8/2012 |
| WO | 2014021388 A1 | 2/2014 |
| WO | 2016085152 A1 | 6/2016 |
| WO | 2016099102 A1 | 6/2016 |
| WO | 2016158975 A1 | 10/2016 |

OTHER PUBLICATIONS

Schwalm, R., "UV Coatings; Basics, Recent Developments and New Applications." Elsevier Science, Dec. 21, 2006, p. 115.

International Search Report for PCT/KR2017/011853 dated Feb. 8, 2018.

Communication pursuant to Art. 94 (3) EPC dated Sep. 10, 2019—Other Evidence; 5 pages.

Reply of the patentee (then applicant) dated Jan. 3, 2020 as filed in the course of the examniation procedure; 7 pages.

Case Number T 0137/01—3.2.6 Other Evidence—Decision of Dec. 15, 2003, Boards of Appeal of the European Patent Office; 23 pages.

Satoshi Matsumoto, Experimental Report concerning the reproduction of "Example 1" in EP2952537, dated Apr. 27, 2021; 5 pages.

Modern Superabsorbent Polymer Technology edited by Fredric Bucholz & Andrew T. Graham, Wiley-VCH, New York, copyright 1998, pp. 55-60 and 197-201; ISBN: 0-471-19411-5.

Notice of Opposition filed against European Patent EP3424988 B1 (Application No. 17883766.2), titled a "Superabsorbent Polymer and Method for Preparing Same", communicated May 3, 2021; 46 pages.

* cited by examiner

SUPER ABSORBENT POLYMER AND METHOD FOR PRODUCING SAME

CROSS-REFERENCE TO RELATED APPLICATION(S)

The present application is a national phase entry under 35 U.S.C. § 371 of International Application No. PCT/KR2017/011853, filed on Oct. 25, 2017, which claims priority to Korean Patent Application No. 10-2016-0178406, filed on Dec. 23, 2016, the disclosures of which are incorporated herein by reference.

TECHNICAL FIELD

The present invention relates to a super absorbent polymer exhibiting more improved absorption under pressure and liquid permeability, even while basically maintaining excellent centrifuge retention capacity and absorption rate, and a method for producing the same.

BACKGROUND

Super absorbent polymer (SAP) is a synthetic polymer material capable of absorbing moisture from about 500 to about 1,000 times its own weight, and each manufacturer has denominated it as different names such as SAM (Super Absorbency Material), AGM (Absorbent Gel Material) or the like. Such super absorbent polymers started to be practically applied in sanitary products, and now they are widely used for preparation of hygiene products such as paper diapers for children or sanitary napkins, water retaining soil products for gardening, water stop materials for the civil engineering and construction, sheets for raising seedling, fresh-keeping agents for food distribution fields, materials for poultice or the like.

In most cases, these super absorbent polymers have been widely used in the field of hygienic materials such as diapers or sanitary napkins.

In most cases, these super absorbent polymers have been widely used in the field of hygienic materials such as diapers or sanitary napkins. In such hygienic materials, the super absorbent polymer is generally contained in a state of being spread in the pulp. In recent years, however, continuous efforts have been made to provide hygienic materials such as diapers having a thinner thickness. As a part of such efforts, the development of so-called pulpless diapers and the like in which the content of pulp is reduced or pulp is not used at all is being actively advanced.

As described above, in the case of hygienic materials in which the pulp content is reduced or the pulp is not used, a super absorbent polymer is contained at a relatively high ratio and these super absorbent polymer particles are inevitably contained in multiple layers in the hygienic materials. In order for the whole super absorbent polymer particles contained in the multiple layers to absorb liquid such as urine more efficiently, not only the super absorbent polymer needs to basically exhibit high centrifuge retention capacity and absorption rate, but also it needs to exhibit more improved liquid permeability and absorption under pressure.

That is, the super absorbent polymer should exhibit more improved liquid permeability, so the super absorbent polymer particles of the surface layer which first comes in contact with the liquid such as urine are absorbed and allow to pass the remaining liquid quickly. It becomes possible to absorb such remaining liquid effectively and quickly by the super absorbent polymer particles of the subsequent layer. Further, the super absorbent polymer must exhibit a further improved absorption under pressure, whereby the super absorbent polymer can exhibit a stable centrifuge retention capacity even when the weight of the wearer is applied in the thinner hygienic material.

However, it is known that the basic centrifuge retention capacity and absorption rate of the super absorbent polymer, and the liquid permeability and absorption under pressure thereof have trade-off relation with each other, and therefore it is very difficult to excellently maintain these properties together. That is, the basic centrifuge retention capacity and absorption rate of the super absorbent polymer is improved as the overall crosslinking density of the polymer is lower, whereas the liquid permeability and absorption under pressure tend to improve as the surface crosslinking density of the polymer increases and the surface strength of the polymer particles increases. It is a fact that there was a limit in excellently exhibiting these properties together.

Conventionally, in an attempt to excellently exhibit these properties together, it has been suggested that the polymerization is carried out in the direction of imparting porosity in order to increase the surface area of the super absorbent polymer while lowering the internal crosslinking density of the super absorbent polymer, and the surface crosslinking is performed in the direction of increasing the surface crosslinking thickness and surface crosslinking density. However, since it is not easy to control the penetration depth of the surface crosslinking agent in the surface crosslinking process, there was a problem that the surface crosslinked layer is hardly formed with uniform thickness and/or density. As a result, there was difficult to sufficiently improve the liquid permeability and the absorption under pressure even in the case of increasing the thickness and the crosslinking density of the surface crosslinked layer.

Technical Problem

It is one object of the present invention to provide a super absorbent polymer exhibiting more improved absorption under pressure and liquid permeability, even while basically maintaining excellent centrifuge retention capacity and absorption rate, and a method for producing the same.

Technical Solution

The present invention provides a super absorbent polymer comprising: a base polymer powder including a first crosslinked polymer of a water-soluble ethylenically unsaturated monomer having at least partially neutralized acidic groups; and a surface crosslinked layer formed on the base polymer powder and including a second crosslinked polymer in which the first crosslinked polymer is further crosslinked via a surface crosslinking agent, wherein the surface crosslinking agent includes at least two compounds having a solubility parameter value ($\sigma$) of 12.5 $(cal/cm^3)^{1/2}$ or more, wherein at least one of the surface crosslinking agents is an alkylene carbonate-based compound, and the remainder is selected from the group consisting of an alkylene carbonate-based compound and a polyhydric alcohol-based compound, and wherein the permeability measured and calculated by the method of the following Equation 1 is 10 to 35 seconds:

$$\text{Permeability (sec)} = T_S - T_0 \quad \text{[Equation 1]}$$

wherein, $T_S$ (unit: sec) means the time required for allowing a 0.9% saline (NaCl) solution to permeate a saline-absorbed super absorbent polymer under a load of 0.3 psi, wherein the saline-absorbed super absorbent polymer is prepared by swelling 0.2 g of super absorbent polymer with the 0.9% saline solution for 30 minutes, and $T_O$ (unit: sec) means the time required for allowing the 0.9% saline solution to permeate under the load of 0.3 psi in the absence of the saline-absorbed super absorbent polymer.

The present invention also provides a method for producing a super absorbent polymer comprising the steps of:

performing crosslinking polymerization of a water-soluble ethylenically unsaturated monomer having at least partially neutralized acidic groups in the presence of an internal crosslinking agent to form a hydrogel polymer containing a first crosslinked polymer;

drying, pulverizing and classifying the hydrogel polymer to form a base polymer power; and heat-treating and surface-crosslinking the base polymer powder in the presence of a surface crosslinking agent to form a super absorbent polymer particle, wherein the surface crosslinking agent includes at least two compounds having a solubility parameter value ($\sigma$) of 12.5 $(cal/cm^3)^{1/2}$ or more, wherein at least one of the surface crosslinking agents is an alkylene carbonate-based compound, and the remainder is selected from the group consisting of an alkylene carbonate-based compound and a polyhydric alcohol-based compound, and wherein the surface-crosslinking step includes a first reaction step in which the reaction is performed at a maximum reaction temperature of 170° C. to 190° C. for 3 to 10 minutes and a second reaction step in which the reaction is performed at a maximum reaction temperature of 190° C. to 220° C. for 20 to 40 minutes.

Hereinafter, a super absorbent polymer according to a specific embodiment of the present invention and a production method thereof will be described in detail. However, this is merely presented as an example of the present invention, and will be apparent to those skilled in the art that the scope of the present invention is not limited to these embodiments, and various modifications can be made to the embodiments within the scope of the present invention.

In addition, unless stated otherwise throughout this specification, the term "comprises" or "contains" refers to including any constituent element (or constituent component) without particular limitation, and it cannot be interpreted as a meaning of excluding an addition of other constituent element (or constituent component).

Meanwhile, according to one embodiment of the invention, there is provided a super absorbent polymer comprising:

a base polymer powder including a first crosslinked polymer of a water-soluble ethylenically unsaturated monomer having at least partially neutralized acidic groups; and a surface crosslinked layer formed on the base polymer powder and including a second crosslinked polymer in which the first crosslinked polymer is further crosslinked via a surface crosslinking agent, wherein the surface crosslinking agent includes at least two compounds having a solubility parameter value ($\sigma$) of 12.5 $(cal/cm^3)^{1/2}$ or more, wherein at least one of the surface crosslinking agents is an alkylene carbonate-based compound, and the remainder is selected from the group consisting of an alkylene carbonate-based compound and a polyhydric alcohol-based compound, and wherein the permeability measured and calculated by the method of the following Equation 1 is 10 to 35 seconds:

$$\text{Permeability (sec)} = T_S - T_O \quad \text{[Equation 1]}$$

wherein, $T_S$ (unit: sec) means the time required for an amount of a 0.9% saline (NaCl) solution to permeate a saline-absorbed super absorbent polymer under a load of 0.3 psi, wherein the saline-absorbed super absorbent polymer is prepared by swelling 0.2 g of super absorbent polymer with the 0.9% saline solution for 30 minutes, and $T_O$ (unit: sec) means the time required for the amount of the 0.9% saline solution to permeate under the load of 0.3 psi in the absence of the saline-absorbed super absorbent polymer.

The super absorbent polymer of one embodiment is prepared, for example, by using at least two surface crosslinking agents satisfying a predetermined solubility parameter value range, having different reactivity, at least one of which is an alkylene carbonate-based compound. In addition, such a super absorbent polymer can be produced by proceeding the surface crosslinking step to which the surface crosslinking agent is applied under constant temperature rising and reaction conditions, as will be described in more detail below.

As a result of continuous studies and experiments, the present inventors have found that as the surface crosslinking step proceeds under these predetermined surface crosslinking agents and conditions, the penetration depth of the surface crosslinking agent can be uniformly controlled, and the degree of crosslinking reaction can be uniformly controlled during surface crosslinking. This is predicted to be because by using a surface crosslinking agent satisfying the above solubility parameter value range, it is possible to maintain the uniform coating effect of the surface crosslinking agent on the base polymer powder and to uniformly control the penetration depth, despite the evaporation of the solvent during surface crosslinking and the change in the concentration of the surface crosslinking agent resulting therefrom. In addition, It is thought that as two or more kinds of surface crosslinking agents having different reactivity and structure are used and the surface crosslinking is carried out under constant surface crosslinking conditions, the surface crosslinking reaction can be caused uniformly despite the irregular shape of the base polymer powder, etc., thereby forming a surface crosslinked layer having uniform thickness and crosslinking density on the base polymer powder.

It has been found that due to the formation of such a uniform surface crosslinked layer, the surface crosslinked layer is formed with a relatively thin thickness, and thereby even if the basic centrifuge retention capacity and absorption rate are slightly decreased, the liquid permeability and the absorption under pressure can be improved with a width larger than previously known. Such improved liquid permeability can be confirmed by the low permeability measured and calculated according to the Equation 1.

Therefore, the super absorbent polymer of one embodiment can exhibit more improved absorption under pressure and liquid permeability, even while basically maintaining excellent centrifuge retention capacity and absorption rate, and thus can be effectively used for various kinds of hygienic materials, especially hygienic materials or the like having reduced pulp content.

In the super absorbent polymer of one embodiment, the base polymer powder may have the component and composition equivalent to those of the base polymer powder of a general super absorbent polymer. Such base polymer powder may include a first crosslinked polymer of an unsaturated monomer having at least partially neutralized acidic groups, such as acrylic acid and its salt, and can be produced according to the production method of another embodiment described below. Therefore, additional description of the constitution of the base polymer powder will be omitted.

Further, in the super absorbent polymer of one embodiment, the surface crosslinked layer may include a second crosslinked polymer in which the first crosslinked polymer of the base polymer powder is further crosslinked via two or more specific surface crosslinking agents.

As the surface crosslinking agent for forming such a surface crosslinked layer, two or more compounds having a solubility parameter value ($\sigma$) of 12.5 $(cal/cm^3)^{1/2}$ or more, or 12.5 to 18.0 $(cal/cm^3)^{1/2}$, or 12.6 to 17.0 $(cal/cm^3)^{1/2}$ can be used. The solubility parameter value ($\sigma$) is a parameter that defines the polarity of a compound, and can be determined with reference to the solubility parameter value $\delta(cal/cm^3)^{1/2}$ reported in Polymer Handbook, 3rd edition (Wiley Interscience Corp.) VII-527-539. Further, in the case of a compound not included in the relevant list, it can be calculated with the numerical value $\delta$ $(cal/cm^3)^{1/2}$ derived by replacing Holley cohesive energy constant reported in the same volume VII-525 in Small's Equation in the same volume VII-524. The solubility parameter values of representative compounds determined or calculated according to the above method are summarized in Table 1 below:

TABLE 1

| Compound | Solubility parameter value $((cal/cm^3)^{1/2})$ |
|---|---|
| Ethylene carbonate | 14.5 |
| Propylene carbonate | 13.3 |
| Propylene glycol | 12.6 |
| Glycerol | 16.5 |
| Ethylene glycol diglycidyl ether | 10.2 |
| 1,3-butanediol | 11.6 |

As already mentioned above, it is considered that as two or more surface crosslinking agents having a solubility parameter value ($\sigma$) of 12.5 $(cal/cm^3)^{1/2}$ or more are used, but at least one of them uses an alkylene carbonate-based compound and the remainder uses an alkylene carbonate-based compound and a polyhydric alcohol-based compound having different reactivity and structure, the uniform coating effect and the penetration depth of the surface crosslinking agent can be achieved despite the uneven particle shape of the base polymer powder and the like. As a result, a surface crosslinked layer having a uniform thickness and a crosslinked density can be formed on the super absorbent polymer particles of one embodiment, thereby further improving the liquid permeability and the absorption under pressure.

On the other hand, ethylene carbonate or propylene carbonate may be used as the alkylene carbonate-based compound having a solubility parameter value of 12.5 $(cal/cm^3)^{1/2}$ or more, and at least one of the surface crosslinking agents may be used as such ethylene carbonate or propylene carbonate.

As the polyhydric alcohol-based compound having a solubility parameter value of 12.5 $(cal/cm^3)^{1/2}$ or more, ethylene glycol, propylene glycol, glycerol, polyglycerol, sorbitol or pentaerythritol may be used. In consideration of the degree of reaction, etc., more suitably, propylene glycol or glycerol may be used. Such a polyhydric alcohol-based compound may be used as the remaining surface crosslinking agent except for at least one alkylene carbonate-based compound.

Meanwhile, the above-mentioned super absorbent polymer can exhibit excellent liquid permeability, and this excellent liquid permeability can be defined by the permeability of 10 to 35 seconds or 20 to 30 seconds measured and calculated by the method of the Equation 1:

$$\text{Permeability (sec)} = T_S - T_0 \qquad \text{[Equation 1]}$$

wherein:

$T_S$ (unit: sec) means the time required for allowing a 0.9% saline (NaCl) solution to permeate a saline-absorbed super absorbent polymer under a load of 0.3 psi, wherein the saline-absorbed super absorbent polymer is prepared by swelling 0.2 g of super absorbent polymer with the 0.9% saline solution for 30 minutes, and $T_0$ (unit: sec) means the time required for allowing the 0.9% saline solution to permeate under the load of 0.3 psi in the absence of the saline-absorbed super absorbent polymer.

The permeability is an index representing how well a saline solution (0.9% NaCl aqueous solution) permeates the swollen super absorbent polymer. This is evaluated by measuring the time taken for 0.9% saline solution to permeate after swelling 0.2 g of the super absorbent polymer powder for 30 minutes and then applying a load of 0.3 psi, in accordance with the method described in the literature (Buchholz. F. L. and Graham. A. T., "Modern Super absorbent polymer Technology." John Wiley & Sons (1998), page 161). A more detailed method of measuring the permeability will be described in detail in the embodiments described below.

Further, the super absorbent polymer of one embodiment may have a fixed height absorption (FHA) under Capillary Pressure of Loaded SAP bed of 20 to 30 g/g, or 21.5 to 28.5 g/g, or 24.5 to 28.5 g/g. Such high FHA value can define an excellent suction force under pressure (capillary absorption capacity) of the super absorbent polymer. Such FHA can be measured and calculated by the method described in column 14/example of U.S. Pat. No. 7,175,910.

In addition, the super absorbent polymer can basically exhibit excellent centrifuge retention capacity and absorption rate. More specifically, the super absorbent polymer may have a centrifuge retention capacity (CRC) for a physiological saline solution (0.9 wt % aqueous sodium chloride solution) for 30 minutes of 25 g/g to 36 g/g, or 28 g/g to 36 g/g, or 28 g/g to 32 g/g.

In this case, the centrifuge retention capacity (CRC) can be calculated by the following Equation 3 after absorbing the super absorbent polymer to a physiological saline solution over 30 minutes:

$$CRC(g/g) = \{[W_2(g) - W_1(g) - W_0(g)]/W_0(g)\}$$

wherein:

$W_0$ (g) is an initial weight (g) of the super absorbent polymer, $W_1$ (g) is the weight of the device not including the super absorbent polymer, measured after immersing and absorbing the same into a physiological saline solution for 30 minutes and then dehydrating the same by using a centrifuge at 250 G for 3 minutes, and $W_2$ (g) is the weight of the device including the super absorbent polymer, measured after immersing and absorbing the super absorbent polymer into a physiological saline solution at room temperature for 30 minutes and then dehydrating the same by using a centrifuge at 250 G for 3 minutes.

Additionally, the super absorbent polymer of one embodiment may have a vortex removal time of 20 to 50 seconds, or 35 to 50 seconds, or 38 to 45 seconds, together with the above-described centrifuge retention capacity and the like. Such a vortex removal time means the time during which a vortex of the liquid disappears due to fast absorption when the super absorbent polymer is added to the physiological saline and stirred.

For example, after the super absorbent polymer is added to a physiological saline (0.9 wt % NaCl solution) under stirring, the vortex removal time can be calculated by a method of measuring the amount of time until a vortex of the liquid caused by the stirring disappears and a smooth surface is formed.

Meanwhile, the super absorbent polymer of one embodiment described above can be typically obtained by performing a crosslinking polymerization of a water-soluble ethylenically unsaturated monomer having at least partially neutralized acidic groups, such as a mixture of acrylic acid and its sodium salt in which at least some carboxylic acid has been neutralized with sodium salt or the like, in the presence of an internal crosslinking agent. More specifically, the super absorbent polymer can be obtained by performing a crosslinking polymerization of said monomer in the presence of an internal crosslinking agent to prepare a base polymer powder, and then surface-crosslinking the base polymer powder in the presence of a specific surface crosslinking agent as described above, under certain crosslinking conditions.

In particular, by controlling the kind of the surface crosslinking agent and the surface crosslinking conditions, it is possible to obtain a super absorbent polymer of one embodiment which includes a surface crosslinked layer having a uniform thickness and crosslinking density and exhibits more improved liquid permeability and absorption under pressure even while maintaining excellent centrifuge retention capacity and absorption rate.

In this regard, according to another embodiment of the invention, there is provided a method for producing a super absorbent polymer comprising the steps of: performing crosslinking polymerization of a water-soluble ethylenically unsaturated monomer having at least partially neutralized acidic groups in the presence of an internal crosslinking agent to form a hydrogel polymer containing a first crosslinked polymer; drying, pulverizing and classifying the hydrogel polymer to form a base polymer power; and heat-treating and surface-crosslinking the base polymer powder in the presence of a surface crosslinking agent to form a super absorbent polymer particle, wherein the surface crosslinking agent includes at least two compounds having a solubility parameter value ($\sigma$) of 12.5 $(cal/cm^3)^{1/2}$ or more, wherein at least one of the surface crosslinking agents is an alkylene carbonate-based compound, and the remainder is selected from the group consisting of an alkylene carbonate-based compound and a polyhydric alcohol-based compound, and wherein the surface-crosslinking step includes a first reaction step in which the reaction is performed at a maximum reaction temperature of 170° C. to 190° C. for 3 to 10 minutes and a second reaction step in which the reaction is performed at a maximum reaction temperature of 190° C. to 220° C. for 20 to 40 minutes.

Hereinafter, one embodiment of the production method of the super absorbent polymer will be described in detail for each step.

First, in the above-mentioned production method, the hydrogel polymer can be formed by performing crosslinking polymerization of a water-soluble ethylenically unsaturated monomer having at least partially neutralized acidic groups in the presence of an internal crosslinking agent.

In this case, the water-soluble ethylenically unsaturated monomer may include at least one selected from the group consisting of anionic monomers of acrylic acid, methacrylic acid, maleic anhydride, fumaric acid, crotonic acid, itaconic acid, 2-acryloylethanesulfonic acid, 2-methacryloylethanesulfonic acid, 2-(meth)acryloylpropanesulfonic acid or 2-(meth)acrylamido-2-methylpropanesulfonic acid, and their salts; non-ionic, hydrophilic group-containing monomers of (meth)acrylamide, N-substituted (meth)acrylate, 2-hydroxyethyl(meth)acrylate, 2-hydroxypropyl(meth)acrylate, methoxypolyethylene glycol(meth)acrylate or polyethylene glycol (meth)acrylate; and amino group-containing unsaturated monomers of (N,N)-dimethylaminoethyl(meth)acrylate or (N,N)-dimethylaminopropyl(meth)acrylamide, and their quaternary product. Among them, acrylic acid or a salt thereof, for example, an alkali metal salt such as acrylic acid and/or a sodium salt thereof having at least partially neutralized acrylic acids can be used, and the use of these monomers enables production of a super absorbent polymer having more excellent physical properties.

In the case of using acrylic acid and its alkali metal salt as a monomer, the monomer can be used by neutralizing acrylic acid with a basic compound such as caustic soda (NaOH). In this case, a degree of neutralization of the water-soluble ethylenically unsaturated monomer may be adjusted to 50 to 95%, or 70 to 85%. Within this range, it is possible to provide a super absorbent polymer having excellent centrifuge retention capacity without fear of precipitation during neutralization.

In the monomer mixture containing the water-soluble ethylenically unsaturated monomer, the concentration of the water-soluble ethylenically unsaturated monomer may be 20 to 60% by weight or 40 to 50% by weight based on the total amount of the monomer mixture including the respective raw materials and solvents described below, which may be appropriately adjusted in consideration of polymerization time, the reaction conditions and the like. However, when the concentration of the monomer is excessively low, the yield of the super absorbent polymer may be lowered, which may cause a problem in economic efficiency. Conversely, when the concentration is excessively high, a part of the monomer may precipitate or the pulverization efficiency may be lowered upon pulverization of the polymerized hydrogel polymer, which may cause a problem in the process, and the physical properties of the super absorbent polymer may be deteriorated.

As the internal crosslinking agent for introducing the basic crosslinking structure into the base polymer powder, any internal crosslinking agent having a crosslinking functional group conventionally used for the production of a super absorbent polymer can be used without particular limitation. However, in order to further improve the physical properties of the super absorbent polymer by introducing an appropriate crosslinking structure into the base polymer powder, more specifically, in order to appropriately achieve physical properties of the base polymer powder described above and thus exhibit an improved liquid permeability and cake inhibition properties of the super absorbent polymer, at least one selected from the group consisting of a bis(meth)acrylamide having 8 to 12 carbon atoms, a polyol poly(meta)acrylate having 2 to 10 carbon atoms and a polyol poly (meth)ally ether having 2 to 10 carbon atoms can be used as the internal crosslinking agent.

More specific examples of the internal crosslinking agent may include at least one selected from the group consisting of polyethylene glycol diacrylate (PEGDA), glycerine diacrylate, glycerin triacrylate, unmodified or ethoxylated trimethylolpropane triacrylate (ethoxylated-TMPTA), hexanediol diacrylate, and triethylene glycol diacrylate. The internal crosslinking agent can be contained at a concentration of 0.01 to 0.5% by weight with respect to the monomer mixture, thereby crosslinking the polymerized polymer.

In addition, the monomer mixture may further include a polymerization initiator that is generally used in the production of a super absorbent polymer.

Specifically, the polymerization initiator that can be used here includes a thermal polymerization initiator or a photo-polymerization initiator by UV irradiation, depending on the polymerization method. However, even in the case of using the photo-polymerization method, because a certain amount of heat is generated by the ultraviolet irradiation or the like and a certain degree of heat is generated according to the progress of the exothermic polymerization reaction, a thermal polymerization initiator may be additionally included.

The photo-polymerization initiator can be used without any limitation in its constitution as long as it is a compound capable of forming a radical by a light such as ultraviolet rays. The photo-polymerization initiator, for example, may include at least one selected from the group consisting of a benzoin ether, a dialkyl acetophenone, a hydroxyl alkylketone, a phenyl glyoxylate, a benzyl dimethyl ketal, an acyl phosphine, and an α-aminoketone. Meanwhile, specific examples of the acyl phosphine may include normal lucirin TPO, namely, 2,4,6-trimethyl-benzoyl-trimethyl phosphine oxide, or IRGACURE 819, namely, bis(2,4,6-trimethylbenzoyl)-phenyl phosphineoxide).

More various photo-polymerization initiators are well disclosed in "UV Coatings: Basics, Recent Developments and New Application" written by Reinhold Schwalm, (Elsevier, 2007), p 115, however the photo-polymerization initiator is not limited to the above-described examples.

The photo-polymerization initiator may be included in a concentration of 0.01 to 1.0% by weight based on the monomer mixture. When the concentration of the photo-polymerization initiator is excessively low, the polymerization rate may become slow, and when the concentration of the photo-polymerization initiator is excessively high, the molecular weight of the super absorbent polymer may become small and its physical properties may become uneven.

Further, as the thermal polymerization initiator, at least one selected from the group consisting of persulfate-based initiator, azo-based initiator, hydrogen peroxide and ascorbic acid can be used. Specifically, examples of the persulfate-based initiators include sodium persulfate ($Na_2S_2O_8$), potassium persulfate ($K_2S_2O_8$), ammonium persulfate (($NH_4$)$_2S_2O_8$) and the like, and examples of the azo-based initiator include 2,2-azobis(2-amidinopropane)dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid) and the like.

More various thermal polymerization initiators are well disclosed in "Principle of Polymerization" written by Odian, (Wiley, 1981), p 203, however the thermal polymerization initiator is not limited to the above-described examples.

The thermal polymerization initiator can be included in the concentration of 0.001 to 0.5% by weight based on the monomer composition. When the concentration of the thermal polymerization initiator is excessively low, the additional thermal polymerization hardly occurs and thus effects due to the addition of the thermal polymerization initiator may be insignificant, and when the concentration of the thermal polymerization initiator is excessively high, the molecular weight of the super absorbent polymer becomes small and the physical properties may become uneven.

In addition, the monomer mixture may further include additives such as a thickener, a plasticizer, a preservation stabilizer, an antioxidant, a surfactant, and so on, as needed. As the additives to be added, various additives widely used in the field of the super absorbent polymer can be used without limitation.

Meanwhile, the raw materials such as the water-soluble ethylenically unsaturated monomer, the photo-polymerization initiator, the thermal polymerization initiator, the internal crosslinking agent, and the additives can be prepared in the form of a solution which is dissolved in a solvent.

In this case, any usable solvent can be used without limitation in its constitution as long as it can dissolve the above-mentioned components. For example, one or more solvents selected from the group consisting of water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butylolactone, carbitol, methylcellosolve acetate, and N,N-dimethyl acetamide, and so on may be used alone or in combination with each other.

The solvent may be included in a residual amount of excluding the above-described components from the total weight of the monomer mixture.

Meanwhile, the method for forming a hydrogel polymer by the thermal polymerization or photopolymerization of such a monomer composition is not particularly limited by its constitution as long as it is a polymerization method commonly used in the art.

Specifically, the polymerization process may be largely classified into a thermal polymerization and a photo-polymerization depending on a polymerization energy source. The thermal polymerization may be typically carried out in a reactor like a kneader equipped with agitating spindles in order to facilitate bubble generation. In contrast, the photo-polymerization may be carried out in a reactor equipped with a movable conveyor belt. However, the above-described polymerization method is an example only, and the present invention is not limited thereto.

Further, a polymerization temperature of the monomer mixture may be controlled from about 40° C. to 90° C., thereby effectively inducing vaporization of the volatile organic solvent and polymerization of the hydrogel polymer in which pores are formed.

In this case, means for achieving the polymerization temperature within the above-described range is not particularly limited. Heating may be performed by providing a heating medium or by directly providing a heat source. The type of the heating medium applicable may be a heated fluid such as steam, hot air, hot oil, etc., but is not limited thereto. Further, the temperature of the heating medium provided may be properly selected in consideration of the means of the heating medium, the temperature raising speed, and the temperature raising target temperature. Meanwhile, a heating method using electricity or a heating method using gas may be used as the heat source provided directly, but the heat source is not limited to these examples.

Further, a polymerization time of the monomer mixture may be controlled from 30 seconds to 10 minutes, thereby forming a hydrogel polymer having an optimized pore structure.

As an example, the hydrogel polymer obtained according to the thermal polymerization that is carried out in the reactor like a kneader equipped with a stirring spindle by providing hot air thereto or heating the reactor may have a particle size of several centimeters to several millimeters when it is discharged from the outlet of the reactor, according to the shape of the stirring spindle equipped in the reactor. Specifically, the size of the obtained hydrogel polymer may vary according to the concentration of the monomer composition injected thereto, the injection speed, or the like, and generally the hydrogel polymer having a weight average particle size of 2 to 50 mm may be obtained.

Further, as described above, when the photo-polymerization is carried out in a reactor equipped with a movable conveyor belt, the obtained hydrogel polymer may be usually a sheet-like hydrogel polymer having a width of the belt. In this case, the thickness of the polymer sheet may vary depending on the concentration and the injection speed of the monomer mixture to be injected thereto, but usually, it is preferable to supply the monomer mixture so that a sheet-like polymer having a thickness of about 0.5 to about 5 cm can be obtained. When the monomer mixture is supplied to such an extent that the thickness of the sheet-like polymer becomes too thin, it is undesirable because the production efficiency is low, and when the thickness of the sheet-like polymer is more than 5 cm, the polymerization reaction cannot be evenly carried out over the entire thickness because of the excessive thickness.

In this case, the hydrogel polymer obtained by the above-mentioned method may have a water content of 40 to 80% by weight. Meanwhile, the "water content" as used herein means a weight occupied by moisture with respect to a total amount of the hydrogel polymer, which may be the value obtained by subtracting the weight of the dried polymer from the weight of the hydrogel polymer. Specifically, the water content can be defined as a value calculated by measuring the weight loss due to evaporation of moisture in the polymer in the process of drying by raising the temperature of the polymer through infrared heating. At this time, the water content is measured under the drying conditions determined as follows: the drying temperature is increased from room temperature to about 180° C. and then the temperature is maintained at 180° C., and the total drying time is set to 20 minutes, including 5 minutes for the temperature rising step.

After the monomers are subjected to a crosslinking polymerization, the base polymer powder can be obtained through steps such as drying, pulverization, classification, and the like, and through the steps such as pulverization and classification, the base polymer powder and the super absorbent polymer obtained therefrom are suitably produced and provided so as to have a particle diameter of 150 to 850 μm. More specifically, at least 95% by weight or more of the base polymer powder and the super absorbent polymer obtained therefrom has a particle diameter of 150 μm to 850 μm and a fine powder having a particle diameter of less than 150 μm can be contained in an amount of less than 3% by weight.

As described above, as the particle diameter distribution of the base polymer powder and the super absorbent polymer is adjusted within the preferable range, the super absorbent polymer finally produced can exhibit the above-mentioned physical properties more satisfactorily.

On the other hand, the method of drying, pulverization and classification will be described in more detail below.

First, when drying the hydrogel polymer, a coarsely pulverizing step may be further carried out before drying in order to increase the efficiency of the drying step, if necessary.

A pulverizing machine used here is not limited by its configuration, and specifically, it may include any one selected from the group consisting of a vertical pulverizer, a turbo cutter, a turbo grinder, a rotary cutter mill, a cutter mill, a disc mill, a shred crusher, a crusher, a chopper, and a disc cutter. However, it is not limited to the above-described examples.

In this case, the coarsely pulverizing step may be carried out so that the particle diameter of the hydrogel polymer becomes about 2 mm to about 10 mm.

Pulverizing the hydrogel polymer into a particle diameter of less than 2 mm is technically not easy due to its high water content, and agglomeration phenomenon between the pulverized particles may occur. Meanwhile, if the polymer is pulverized into a particle diameter of greater than 10 mm, the effect of increasing the efficiency in the subsequent drying step may be insignificant.

The hydrogel polymer coarsely pulverized as above or the hydrogel polymer immediately after polymerization without the coarsely pulverizing step is subjected to a drying step. In this case, the drying temperature of the drying step may be 50° C. to 250° C. When the drying temperature is less than 50° C., it is likely that the drying time becomes too long or the physical properties of the super absorbent polymer finally formed is deteriorated, and when the drying temperature is higher than 250° C., only the surface of the polymer is excessively dried, and thus it is likely that fine powder is generated during the subsequent pulverizing step, and the physical properties of the super absorbent polymer finally formed is deteriorated. Preferably, the drying can be carried out at a temperature of 150 to 200° C., more preferably at a temperature of 160 to 190° C.

Meanwhile, the drying time may be 20 minutes to 15 hours, in consideration of the process efficiency and the like, but it is not limited thereto.

In the drying step, the drying method may also be selected and used without being limited by its constitution if it is a method generally used for drying the hydrogel polymer. Specifically, the drying step may be carried out by a method such as hot air supply, infrared irradiation, microwave irradiation or ultraviolet irradiation. After the drying step as above is carried out, the water content of the polymer may be 0.05 to 10% by weight.

Subsequently, the dried polymer obtained through the drying step is subjected to a pulverization step.

The polymer powder obtained through the pulverizing step may have a particle diameter of 150 μm to 850 μm. Specific examples of a pulverizing device that can be used to achieve the above particle diameter may include a ball mill, a pin mill, a hammer mill, a screw mill, a roll mill, a disc mill, a jog mill or the like, but the present invention is not limited thereto.

Also, in order to control the physical properties of the super absorbent polymer powder finally commercialized after the pulverization step, a separate step of classifying the polymer powder obtained after the pulverization step depending on the particle diameter may be undergone. Preferably, a polymer having a particle diameter of 150 to 850 μm is classified and only the polymer powder having such a particle diameter is subjected to the surface crosslinking reaction and finally commercialized.

On the other hand, after performing the step of forming the base polymer powder described above, the method for producing the super absorbent polymer of the one embodiment may include a step of heat-treating and surface-crosslinking the base polymer powder in the presence of a surface crosslinking agent satisfying a predetermined solubility parameter value range, at least one of which is an alkylene carbonate-based compound. The surface crosslinking step may be carried out through a plurality of reaction steps including a first reaction step in which the reaction is performed at a maximum reaction temperature of 170° C. to 190° C. or 180° C. to 188° C. for 3 to 10 minutes, or 4 to 8 minutes, and a second reaction step in which the reaction is performed at a higher temperature than that of the first reaction step, for example, at a maximum reaction temperature of 190° C. to 220° C., or 192° C. to 200° C. for 20 to 40 minutes, or 25 to 35 minutes.

By applying such surface crosslinking conditions and the surface crosslinking agents described above, the super absorbent polymer can contain a surface crosslinked layer having more uniform thickness and crosslinking density, and more improved liquid permeability and absorption under pressure can be exhibited without greatly lowering the basic centrifuge retention capacity and the like after formation of the surface crosslinked layer.

On the other hand, since the kind of the surface crosslinking agent has already been described in the above-mentioned surface crosslinking step, additional description thereof will be omitted.

The surface crosslinking agent may be provided in the form of a surface crosslinking solution which is dissolved in a solvent. Such surface crosslinking solution may include at least one solvent selected from the group consisting of water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, and N,N-dimethylacetamide.

Further, the surface crosslinking agent contained in the surface crosslinking solution can be used in an amount of 0.01 to 4 parts by weight based on 100 parts by weight of the base polymer powder. Among such surface crosslinking solution, at least one surface crosslinking agent being an alkylene carbonate-based compound and the remaining surface crosslinking agent can be used by mixing in a weight ratio of 5:1 to 1:5, or 4:1 to 1:4, or 3:1 to 1:3.

Further, the surface crosslinking step can be carried out by including the polycarboxylic acid-based polymer together with the surface crosslinking agent in the surface crosslinking solution. As the polycarboxylic acid-based polymer, a polycarboxylic acid-based copolymer disclosed in Korean Patent Laid-Open Publication No. 2015-0143167 (Korean Patent Application No. 2014-0072343) can be representatively used. Such polymer may be contained in the surface cross-linking solution in an amount of 1 part by weight or less, or 0.01 to 0.5 parts by weight, based on 100 parts by weight of the base polymer powder. This polymer can be contained in the surface crosslinking solution in an amount of 1 part by weight or less, or 0.01 to 0.5 part by weight based on 100 parts by weight of the base polymer powder. Due to the additional use of these polycarboxylic acid-based polymers, it is possible to further improve the liquid permeability and the centrifuge retention capacity of the super absorbent polymer.

Moreover, in the surface crosslinking step, the surface crosslinking solution may further contain a thickener. If the surface of the base polymer powder is further crosslinked in the presence of the thickener as described above, it is possible to minimize the deterioration of physical properties even after the pulverization.

More specifically, as the thickener, at least one selected from a polysaccharide and a hydroxy-containing polymer may be used.

Among them, the polysaccharide may be a gum type thickener, a cellulose type thickener and the like. Specific examples of the gum type thickener include xanthan gum, arabic gum, karaya gum, tragacanth gum, ghatti gum, guar gum, locust bean gum, psyllium seed gum and the like. Specific examples of the cellulose type thickener include hydroxypropylmethyl cellulose, carboxymethyl cellulose, methylcellulose, hydroxymethyl cellulose, hydroxyethyl cellulose, hydroxypropyl cellulose, hydroxyethylmethyl cellulose, hydroxymethylpropyl cellulose, hydroxyethylhydroxypropyl cellulose, ethylhydroxyethyl cellulose, methylhydroxypropyl cellulose, and the like. Meanwhile, specific examples of the hydroxy-containing polymer include polyethylene glycol, polyvinyl alcohol, and the like.

The surface crosslinking solution may further include a thermal initiator such as $Na_2S_2O_5$ so that the surface crosslinking reaction may occur more smoothly depending on the kind of the surface crosslinking solution, and may further include a commercially available discoloration inhibitor.

On the other hand, the surface crosslinking step can be carried out by heat-treating the base polymer powder in the presence of the above-mentioned surface crosslinking solution. More specifically, the step of the reaction by such a heat treatment may be carried out through a plurality of reaction steps including a first reaction step in which the reaction is performed at a maximum reaction temperature of 170° C. to 190° C., or 180° C. to 188° C. for 3 to 10 minutes, or 4 to 8 minutes, and a second reaction step in which the reaction is performed at a higher temperature than that of the first reaction step, for example, at a maximum reaction temperature of 190° C. to 220° C. or 192° C. to 200° C. for 20 to 40 minutes, or 25 to 35 minutes.

In addition, between these plural reaction steps, for example, before the first and second reaction steps, the temperature raising step for reaching the maximum reaction temperature may be further included. The temperature raising step before the first reaction step may be carried out at a temperature raising rate of 1.5° C./min to 3.0° C./min or 2.0° C./min to 2.7° C./min. and the temperature rising step before the second reaction step (i.e., the temperature rising step between the first and second reaction steps) may be carried out at a temperature raising rate of 1.2° C./min to 2.3° C./min or at a temperature raising rate of 1.5° C./min to 2.2° C./min.

As described above, a plurality of reaction steps to which a predetermined maximum reaction temperature and a holding time are applied and, more suitably, the surface crosslinking step proceeds under the application of a constant heating rate, the surface crosslinking reaction can occur more uniformly despite the irregular particle shape of the base polymer powder and the like. As a result, a surface crosslinked layer having a very uniform thickness and a crosslinking density can be formed. Therefore, it is possible to produce a super absorbent polymer satisfying more improved liquid permeability and absorption under pressure while maintaining excellent centrifuge retention capacity or absorption rate.

Meanwhile, the temperature raising means for the surface crosslinking reactions is not particularly limited. The heating can be carried out by providing a heating medium or directly providing a heating source. The type of heat medium that can be used here includes a heated fluid such as steam, hot air, hot oil, etc., but it is not limited thereto. Further, the temperature of the heating medium to be provided can be appropriately selected in consideration of the means of the heating medium, the temperature raising speed, and the temperature raising target temperature. Meanwhile, a heat source to be provided directly may include a heating method using electricity or a heating method using gas, but is not limited to the above-described examples.

According to the present invention, there can be provided a super absorbent polymer exhibiting more improved absorption under pressure and liquid permeability, even while basically maintaining excellent centrifuge retention capacity and absorption rate, and a method for producing the same.

Such super absorbent polymer is preferably used for hygienic materials such as diapers in which the pulp content is reduced or the pulp is not used, thereby exhibiting excellent performance.

DETAILED DESCRIPTION OF THE EMBODIMENTS

Hereinafter, preferred examples are provided for better understanding of the invention. However, these Examples are given for illustrative purposes only and are not intended to limit the scope of the present invention thereto.

In the following Examples and Comparative Examples, the physical properties of the respective super absorbent polymers (or base polymer powders) were measured and evaluated by the following methods.

(1) Evaluation of Particle Diameter

The particle diameter of the super absorbent polymer used in Examples and Comparative Examples was measured in accordance with EDANA (European Disposables and Nonwovens Association) recommended test method No. WSP 220.3.

(2) Centrifuge Retention Capacity (CRC)

The centrifuge retention capacity (CRC) by water absorption capacity under a non-loading condition was measured for the super absorbent polymers of Examples and Comparative Examples in accordance with EDANA (European Disposables and Nonwovens Association) recommended test method No. WSP 241.3.

That is, $W_0$ (g, about 0.2 g) of the super absorbent polymer was uniformly put in a nonwoven fabric-made bag, followed by sealing. Then, the bag was immersed in a physiological saline solution composed of 0.9 wt % aqueous sodium chloride solution at room temperature. After 30 minutes, water was removed from the bag by centrifugation at 250 G for 3 minutes, and the weight $W_2$ (g) of the bag was then measured. Further, the same procedure was carried out without using the super absorbent polymer, and then the resultant weight $W_1$ (g) was measured.

Using the respective weights thus obtained, CRC (g/g) was calculated according to the following Equation 3, thereby confirming the centrifuge retention capacity.

$$CRC(g/g) = \{[W_2(g) - W_1(g) - W_0(g)]/W_0(g)\}$$

wherein, $W_0$ (g) is an initial weight (g) of the super absorbent polymer, $W_1$ (g) is the weight of the device not including the super absorbent polymer, measured after immersing and absorbing the same into a physiological saline solution for 30 minutes and then dehydrating the same by using a centrifuge at 250 G for 3 minutes, and $W_2$ (g) is the weight of the device including the super absorbent polymer, measured after immersing and absorbing the super absorbent polymer into a physiological saline solution at room temperature for 30 minutes and then dehydrating the same by using a centrifuge at 250 G for 3 minutes.

(2) Permeability

Permeability was measured by using a 0.9% saline solution under a load of 0.3 psi according to the method disclosed in the literature (Buchholz, F. L. and Graham, A. T., "Modern Superabsorbent Polymer Technology," John Wiley & Sons (1998), page 161).

More specific measurement method is described as follows, 0.2 g of particles having a particle size of 300 to 600 μm were taken from the super absorbent polymers (hereinafter, referred to as a sample) prepared in Examples and Comparative Examples, and added to a cylinder (Ø20 mm), wherein the cylinder has a stopcock on one end, an upper limit mark and a lower limit mark thereon. The upper limit mark on the cylinder is indicated at the position of which 40 ml of (saline) solution is filled into the cylinder, and the lower limit mark on the cylinder is indicated at the position of which 20 ml of (saline) solution is filled into the cylinder.

50 g of 0.9% saline (NaCl) solution was added to the cylinder with the stopcock in a closed position, and left for 30 minutes. Then, if necessary, additional saline solution is added to the cylinder to bring the level of saline solution to the upper limit mark on the cylinder. Then, the cylinder including the now saline-absorbed super absorbent polymers is pressurized with a load of 0.3 psi, and left for 1 minute. Thereafter, the stopcock at the bottom of the cylinder was open to measure the time taken for the 0.9% saline solution to pass from the upper limit mark to the lower limit mark on the cylinder. All measurements were carried out at a temperature of 24±1° C. and relative humidity of 50±10%.

The time taken to pass from the upper limit mark to the lower limit mark was measured for respective samples ($T_s$) and also measured in the absence of the super absorbent polymers ($T_0$), and permeability was calculated by the following Equation 1:

$$\text{Permeability (sec)} = T_S - T_0 \quad \text{[Equation 1]}$$

wherein:

$T_S$ (unit: sec) means the time required for allowing a 0.9% saline (NaCl) solution to permeate a saline-absorbed super absorbent polymer under a load of 0.3 psi, wherein the saline-absorbed super absorbent polymer is prepared by swelling 0.2 g of super absorbent polymer with the 0.9% saline solution for 30 minutes, and $T_0$ (unit: sec) means the time required for allowing the 0.9% saline solution to permeate under the load of 0.3 psi in the absence of the saline-absorbed super absorbent polymer.

(4) Absorption Rate (Vortex Test)

50 mL of a 0.9 wt % NaCl solution was put in a 100 mL beaker, and then 2 g of each super absorbent polymer prepared in Examples and Comparative Examples was added thereto while stirring at 600 rpm using a stirrer. Then, the vortex time was calculated by measuring the amount of time until a vortex of the liquid caused by the stirring disappeared and a smooth surface was formed, and the result was shown as the vortex removal time.

(5) Fixed Height Absorption (FHA) Under Capillary Pressure

The physical property of FHA was measured and calculated as a fixed height absorption (20 cm) by the method described in column 14/example of U.S. Pat. No. 7,175,910.

Preparation Example: Preparation of Base Polymer Powder 450 g of acrylic acid was added to a 2 L glass beaker, to which 693.88 g of a 24% caustic soda aqueous solution was slowly poured and mixed to prepare a first solution. At this time, neutralization heat was generated, and the mixed solution was stirred at room temperature and cooled to about 41° C. Subsequently, a first solution prepared by adding 0.225 g of polyethylene glycol diacrylate (PEGDA 600), 0.16 g of a surfactant (S1670) and 0.045 g of dioctyl sulfosuccinate sodium salt (AOT) to 50 g of acrylic acid; 26 g of a 4% aqueous solution of sodium bicarbonate ($NaHCO_3$) (third solution); 35 g of a 0.31% aqueous solution of ascorbic acid (fourth solution); and a solution prepared by diluting 1 g of hydrogen peroxide and 0.69 g of potassium persulfate in 40 g of distilled water (fifth solution) were sequentially added to the first solution.

When the solution stirred in the beaker was gelled and stirring was stopped, the solution was immediately poured in a Vat-type tray (15 cm in width×15 cm in length). The poured gel was foamed at about 20 seconds, polymerized and slowly shrunk. The sufficiently shrunk polymer was torn into 5 to 10 pieces and transferred into a kneader. The lid was closed and kneading was carried out for 5 minutes. In the kneading process, the lid was opened at the lapse of 4 minutes from the beginning, and 50 g of 3.5% aqueous solution of potassium persulfate was sprayed onto the polymer inside the kneader, and then the lid was closed.

Thereafter, the polymer was passed through a hole having a diameter of 13 mm using a meat chopper to prepare crumbs.

Then, the crumbs were dried in an oven capable of shifting airflow up and down. The crumbs were uniformly dried by flowing hot air at 180° C. from the bottom to the top for 15 minutes and from the top to the bottom for 15 minutes, so that the dried product had a water content of about 2% or less.

The dried crumbs were pulverized using a pulverizer and classified to obtain a base polymer powder having a particle diameter of 150 to 850 μm.

Example 1: Preparation of Super Absorbent Polymer 100 g of the base polymer powder obtained in Preparation Example 1 was added to a high speed mixer to obtain a surface crosslinking solution with the following composition.

The surface crosslinking solution was that prepared by mixing 3 wt % of water, 1 wt % of ethanol, 1 wt % of ethylene carbonate, 1 wt % of propylene carbonate, 0.05 wt % of a polycarboxylic acid-based copolymer disclosed in Preparation Example 1 of Korean Patent Laid-open Publication No. 2015-0143167 (Korean Patent Application No. 2014-0072343), 0.1 wt % of $Na_2S_2O_5$ as a thermal initiator, and 0.03 wt % of a discoloration inhibitor (trade name: Blancolen® HP), with respect to the base polymer powder.

Such surface crosslinking solution was added to the high speed mixer, and then stirred at 1000 rpm for 30 seconds. The initial temperature of the surface crosslinking solution immediately after the stirring was 24° C. Thereafter, the temperature raising step, the first reaction step, the temperature raising step and the second reaction step were sequentially carried out according to the conditions described in Table 2 below to proceed the surface crosslinking reaction. The temperature rising rate at each temperature raising step, the maximum reaction temperature at the first and second reaction steps, and the reaction time at the corresponding maximum reaction temperature are summarized in Table 2 below.

Example 2: Preparation of Super Absorbent Polymer

A surface crosslinking solution was obtained in the same manner as in Example 1, except that 1 wt % of glycerol was used instead of propylene carbonate in Example 1.

Such surface crosslinking solution was added to the high speed mixer, and then stirred at 1000 rpm for 30 seconds. The initial temperature of the surface crosslinking solution immediately after the stirring was 24° C. Thereafter, the temperature raising step, the first reaction step, the temperature raising step and the second reaction step were sequentially carried out according to the conditions described in Table 2 below to proceed the surface crosslinking reaction. The temperature rising rate at each temperature raising step, the maximum reaction temperature at the first and second reaction steps, and the reaction time at the corresponding maximum reaction temperature are summarized in Table 2 below.

Example 3: Preparation of Super Absorbent Polymer

A surface crosslinking solution was obtained in the same manner as in Example 1, except that 1 wt % of propylene glycerol was used instead of propylene carbonate in Example 1.

Such surface crosslinking solution was added to the high speed mixer, and then stirred at 1000 rpm for 30 seconds. The initial temperature of the surface crosslinking solution immediately after the stirring was 24° C. Thereafter, the temperature raising step, the first reaction step, the temperature raising step and the second reaction step were sequentially carried out according to the conditions described in Table 2 below to proceed the surface crosslinking reaction. The temperature rising rate at each temperature raising step, the maximum reaction temperature at the first and second reaction steps, and the reaction time at the corresponding maximum reaction temperature are summarized in Table 2 below.

Example 4: Preparation of Super Absorbent Polymer

A surface crosslinking solution was obtained in the same manner as in Example 1, except that the content range of ethylene carbonate and propylene carbonate in Example 1 was changed to 1.5 wt % of ethylene carbonate and 0.5 wt % of propylene carbonate.

Such surface crosslinking solution was added to the high speed mixer, and then stirred at 1000 rpm for 30 seconds. The initial temperature of the surface crosslinking solution immediately after the stirring was 24° C. Thereafter, the temperature raising step, the first reaction step, the temperature raising step and the second reaction step were sequentially carried out according to the conditions described in Table 2 below to proceed the surface crosslinking reaction. The temperature rising rate at each temperature raising step, the maximum reaction temperature at the first and second reaction steps, and the reaction time at the corresponding maximum reaction temperature are summarized in Table 2 below.

Comparative Example 1: Preparation of Super Absorbent Polymer

A surface crosslinking solution was obtained in the same manner as in Example 1, except that only 2 wt % of ethylene carbonate was used instead of ethylene carbonate and propylene carbonate in Example 1.

Such surface crosslinking solution was added to the high speed mixer, and then stirred at 1000 rpm for 30 seconds. The initial temperature of the surface crosslinking solution immediately after the stirring was 24° C. Thereafter, the temperature raising step, the first reaction step, the temperature raising step and the second reaction step were sequentially carried out according to the conditions described in Table 2 below to proceed the surface crosslinking reaction. The temperature rising rate at each temperature raising step, the maximum reaction temperature at the first and second reaction steps, and the reaction time at the corresponding maximum reaction temperature are summarized in Table 2 below.

Comparative Example 2: Preparation of Super Absorbent Polymer

A surface crosslinking solution was obtained in the same manner as in Example 1, except that 2 wt % of 1,3-butanediol was used instead of ethylene carbonate and propylene carbonate in Example 1.

Such surface crosslinking solution was added to the high speed mixer, and then stirred at 1000 rpm for 30 seconds. The initial temperature of the surface crosslinking solution immediately after the stirring was 24° C. Thereafter, the temperature raising step, the first reaction step, the temperature raising step and the second reaction step were sequentially carried out according to the conditions described in Table 2 below to proceed the surface crosslinking reaction. The temperature rising rate at each temperature raising step, the maximum reaction temperature at the first and second reaction steps, and the reaction time at the corresponding maximum reaction temperature are summarized in Table 2 below.

Comparative Example 3: Preparation of Super Absorbent Polymer

A surface crosslinking solution was obtained in the same manner as in Example 1, except that 1 wt % of glycerol and 1 wt % of ethylene glycol diglycidyl ether were used instead of ethylene carbonate and propylene carbonate in Example 1.

Such surface crosslinking solution was added to the high speed mixer, and then stirred at 1000 rpm for 30 seconds. The initial temperature of the surface crosslinking solution immediately after the stirring was 24° C. Thereafter, the temperature raising step, the first reaction step, the temperature raising step and the second reaction step were sequentially carried out according to the conditions described in Table 2 below to proceed the surface crosslinking reaction. The temperature rising rate at each temperature raising step, the maximum reaction temperature at the first and second reaction steps, and the reaction time at the corresponding maximum reaction temperature are summarized in Table 2 below.

Comparative Example 4: Preparation of Super Absorbent Polymer

A surface crosslinking solution was obtained in the same manner as in Example 1, except that 1 wt % of 1,3-butanediol and 1 wt % of propylene glycol were used instead of ethylene carbonate and propylene carbonate in Example 1.

Such surface crosslinking solution was added to the high speed mixer, and then stirred at 1000 rpm for 30 seconds. The initial temperature of the surface crosslinking solution immediately after the stirring was 24° C. Thereafter, the temperature raising step, the first reaction step, the temperature raising step and the second reaction step were sequentially carried out according to the conditions described in Table 2 below to proceed the surface crosslinking reaction. The temperature rising rate at each temperature raising step, the maximum reaction temperature at the first and second reaction steps, and the reaction time at the corresponding maximum reaction temperature are summarized in Table 2 below.

Comparative Example 5: Preparation of Super Absorbent Polymer

A surface crosslinking solution equal to that of Example 1 was formed. Such surface crosslinking solution was added to the high speed mixer, and then stirred at 1000 rpm for 30 seconds. The initial temperature of the surface crosslinking solution immediately after the stirring was 24° C. Thereafter, the temperature raising step, the first reaction step, the temperature raising step and the second reaction step were sequentially carried out according to the conditions described in Table 2 below to proceed the surface crosslinking reaction. The temperature rising rate at each temperature raising step, the maximum reaction temperature at the first and second reaction steps, and the reaction time at the corresponding maximum reaction temperature are summarized in Table 2 below.

The crosslinking conditions of Examples 1 to 4 and Comparative Examples 1 to 5 and the ranges of the physical properties of the super absorbent polymers obtained in those Examples and Comparative Examples are collectively shown in Table 2 below.

TABLE 2

| | First reaction step | | | Second reaction temperature | | | Physical properties | | | |
|---|---|---|---|---|---|---|---|---|---|---|
| | Temperature rising rate (° C./min) | Maximum temperature (° C.) | Reaction time (min) | Temperature rising rate (° C./min) | Maximum temperature (° C.) | Reaction time (min) | CRC (g/g) | FHA (g/g) | Permeability (sec) | Vortex (sec) |
| Example 1 | 2.5 | 185 | 5 | 2 | 195 | 30 | 28.7 | 25.5 | 24 | 41 |
| Example 2 | 2.5 | 185 | 5 | 2 | 195 | 30 | 28.6 | 24.8 | 27 | 42 |
| Example 3 | 2.5 | 185 | 5 | 2 | 195 | 30 | 28.8 | 25.2 | 28 | 42 |
| Example 4 | 2.5 | 185 | 5 | 2 | 195 | 30 | 29.1 | 24.9 | 24 | 40 |
| Comparative Example 1 | 1 | 183 | 0 | 0 | 183 | 40 | 28.5 | 23.1 | 45 | 42 |
| Comparative Example 2 | 1 | 185 | 0 | 0 | 185 | 40 | 29.2. | 22.4 | 54 | 40 |
| Comparative Example 3 | 1 | 150 | 5 | 1 | 195 | 35 | 28.3 | 22.2 | 42 | 41 |
| Comparative Example 4 | 1 | 185 | 5 | 1 | 195 | 35 | 28.6 | 21.6 | 53 | 42 |
| Comparative Example 5 | 1 | 183 | 0 | 0 | 183 | 40 | 28.9 | 23.3 | 44 | 42 |

Referring to Table 2, it was confirmed that the super absorbent polymers of Examples 1 to 4 exhibit more improved fixed height absorption (FHA) under pressure and liquid permeability (permeability), even while maintaining excellent centrifuge retention capacity (CRC) and absorption rate (vortex).

In contrast, it was confirmed that the super absorbent polymers of Comparative Examples 1 to 4 using only one type of surface crosslinking agent or using the outer surface crosslinking agent deviating from the solubility parameter value range of Examples exhibit inferior absorption under pressure and/or liquid permeability as compared with Examples.

In addition, it was confirmed that in the case of Comparative Example 5 in which the surface crosslinking is substantially carried out by a single reaction step, the fixed height absorption under pressure and/or liquid permeability are inferior to those in the Example.

The invention claimed is:

1. A super absorbent polymer comprising:
   a base polymer powder including a first crosslinked polymer, wherein the first crosslinked polymer polymerized from a water-soluble ethylenically unsaturated monomer in the presence of an internal crosslinking agent, wherein the water-soluble ethylenically unsaturated monomer having at least partially neutralized acidic groups; and
   a surface crosslinked layer formed on the base polymer powder, wherein the surface crosslinking layer includes a second crosslinked polymer, wherein the second crosslinked polymer is formed by further crosslinking the first crosslinked polymer in the presence of a surface crosslinking agent,
   wherein the surface crosslinking agent includes at least two compounds, wherein each of the at least two compounds has a solubility parameter value ($\sigma$) of 12.5 $(cal/cm^3)^{1/2}$ or more,
   wherein one of the at least two compounds is a first alkylene carbonate-based compound, and another of the at least two compounds is selected from the group consisting of a second alkylene carbonate-based compound and a polyhydric alcohol-based compound, wherein the second alkylene carbonate-based compound is different from the first alkylene carbonate compound,
   wherein the surface crosslinking agent further includes a polycarboxylic acid-based polymer in an amount of 0.01 parts to 0.5 parts by weight, based on 100 parts by weight of the base polymer powder, and
   wherein the permeability measured and calculated by the method of the following Equation 1 is 24 to 30 seconds:

$$\text{Permeability (sec)} = T_S - T_0 \qquad \text{[Equation 1]}$$

wherein:
   $T_S$ (unit: sec) means the time required for allowing a 0.9% saline (NaCl) solution to permeate a saline-absorbed super absorbent polymer under a load of 0.3 psi, wherein the saline-absorbed super absorbent polymer is prepared by swelling 0.2 g of super absorbent polymer with the 0.9% saline solution for 30 minutes, and
   $T_0$ (unit: sec) means the time required for allowing the 0.9% saline solution to permeate under the load of 0.3 psi in the absence of the saline-absorbed super absorbent polymer.

2. The super absorbent polymer according to claim 1, wherein the first alkylene carbonate-based compound includes ethylene carbonate or propylene carbonate.

3. The super absorbent polymer according to claim 1, wherein the polyhydric alcohol-based compound includes ethylene glycol, propylene glycol, glycerol, polyglycerol, sorbitol or pentaerythritol.

4. The super absorbent polymer according to claim 1, wherein the super absorbent polymer has a centrifuge retention capacity (CRC) for a physiological saline solution (0.9 wt % aqueous sodium chloride solution) for 30 minutes of 25 g/g to 36 g/g, and a vortex removal time of 20 to 50 seconds.

5. The super absorbent polymer according to claim 1, wherein the super absorbent polymer has a fixed height absorption (FHA) under Capillary Pressure of Loaded SAP bed of 20 to 30 g/g.

6. The super absorbent polymer according to claim 1, wherein the first alkylene carbonate-based compound is ethylene carbonate, and wherein the polyhydric alcohol-based compound is selected from the group consisting of propylene glycol, glycerol, polyglycerol, sorbitol and pentaerythritol.

7. The super absorbent polymer according to claim 1, wherein the first alkylene carbonate-based compound is propylene carbonate, and wherein the polyhydric alcohol-based compound is selected from the group consisting of ethylene glycol, propylene glycerol, polyglycerol, sorbitol and pentaerythritol.

\* \* \* \* \*